United States Patent [19]
Saeki et al.

[11] Patent Number: 5,856,288
[45] Date of Patent: Jan. 5, 1999

[54] POLYALKYLENE GLYCOL-POLYGLYOXYLATE BLOCK COPOLYMER, ITS PRODUCTION PROCESS AND USE

[75] Inventors: Takuya Saeki, Suita; Hideyuki Nishibayashi, Nishinomiya; Tsuyoshi Hirata, Kobe; Shigeru Yamaguchi, Himeji, all of Japan

[73] Assignee: Nippon Shokubai Co., Ltd., Japan

[21] Appl. No.: 843,816

[22] Filed: Apr. 21, 1997

[30] Foreign Application Priority Data

Apr. 26, 1996 [JP] Japan .................. 8-108134

[51] Int. Cl.$^6$ .................. C11D 3/37; C08G 2/38; C08G 4/00
[52] U.S. Cl. .................. 510/360; 252/180; 252/356; 510/361; 510/434; 510/476; 510/533; 528/232; 528/245
[58] Field of Search .................. 510/475, 476, 510/360, 361, 531, 533, 223, 230, 434; 252/244, 245, 180, 356; 528/232, 245

[56] References Cited

U.S. PATENT DOCUMENTS

| | | | |
|---|---|---|---|
| 4,140,676 | 2/1979 | Crutchfield et al. | 525/398 |
| 4,144,226 | 3/1979 | Crutchfield et al. | |
| 4,146,495 | 3/1979 | Crutchfield et al. | 510/476 |
| 4,201,858 | 5/1980 | Crutchfield et al. | 525/232 |
| 4,204,052 | 5/1980 | Crutchfield et al. | |
| 4,224,420 | 9/1980 | Papanu et al. | 525/401 |
| 4,225,685 | 9/1980 | Dyroff et al. | 525/401 |
| 4,226,959 | 10/1980 | Dyroff et al. | 525/401 |
| 4,226,960 | 10/1980 | Dyroff et al. | 525/401 |
| 4,233,422 | 11/1980 | Dyroff et al. | 525/398 |
| 4,233,423 | 11/1980 | Dyroff et al. | 525/398 |
| 4,302,564 | 11/1981 | Dyroff et al. | 525/398 |
| 4,303,777 | 12/1981 | Crutchfield et al. | 525/398 |
| 4,315,092 | 2/1982 | Crutchfield et al. | 528/230 |
| 4,436,933 | 3/1984 | Diery. | |
| 4,542,206 | 9/1985 | Dyroff | 528/488 |
| 4,600,750 | 7/1986 | Dyroff et al. | 525/398 |

FOREIGN PATENT DOCUMENTS

| | | |
|---|---|---|
| 0 001 004 | 3/1979 | European Pat. Off. . |
| 31 36 025 | 3/1983 | Germany . |
| 41 06 355 | 9/1992 | Germany . |
| Kokai S54-52196 | 4/1979 | Japan . |

*Primary Examiner*—Ardith Hertzog

[57] ABSTRACT

A new block copolymer, which is excellent with regard to abilities such as dispersibility, chelatability, and scale inhibitability, includes a polyalkylene glycol structural unit and a polyglyoxylate structural unit. This block copolymer, for example, can be produced by carrying out a polymerization reaction between a polyalkylene glycol and a glyoxylic acid-based monomer in the presence of a catalyst in a polymerization reaction system having a water content of about 30 mol % or less relative to the polyalkylene glycol, and used as a cement dispersant, pigment dispersant, water-treating agent, or detergent builder.

21 Claims, No Drawings

POLYALKYLENE GLYCOL-POLYGLYOXYLATE BLOCK COPOLYMER, ITS PRODUCTION PROCESS AND USE

BACKGROUND OF THE INVENTION

A. Technical Field

The present invention relates to a block copolymer which displays excellent performance such as dispersibility, and to a production process for the block copolymer, and uses of the block copolymer.

B. Background Art

Hitherto, a polyether block copolymer is known which has structural units derived from ethylene- and propylene oxides respectively. Such a block polymer has surface activity. However, when used as a pigment dispersant, it does not display satisfactory performance. In addition, when used as a water-treating agent, it does not display satisfactory scale inhibitability, either, and when used for trapping hardness components in water or used as a mud dirt dispersant, it does not provide any satisfactory results, either.

As to a polymer having both structural units derived from an alkylene oxide and a carboxylic acid, U.S. Pat. No. 4,204,052 discloses a random copolymer having structural units derived from ethylene oxide and a glyoxylic acid derivative respectively. In addition, U.S. Pat. No. 4,144,226 discloses a polymer of glyoxylic acid, of which both terminal moieties are ethylene glycol monoether derivative ones as obtained by reacting 1 to 3 molecules of ethylene oxide upon both terminal moieties of a polymer molecule for stabilization. These U.S. patents both disclose that polymers, as disclosed therein, are used as detergent builders.

In the random copolymer as disclosed in U.S. Pat. No. 4,204,052, carboxylate ions are arranged on the polymer at random. For example, in the case where this polymer is used as a cement dispersant, it has negative charges to the same extent at any polymer side chain moiety and is therefore adsorbed to cement particles almost homogeneously. Thus, polymer moieties that are not adsorbed to cement particles are considered few, so it cannot be expected to effectively disperse cement particles utilizing steric repulsion between these polymer moieties that are not adsorbed to cement particles. In addition, in the case where the homopolymers as disclosed in U.S. Pat. No. 4,144,226 are used as a cement dispersant, the contribution of the terminal alkylene oxide moiety of this polymer is so small that this polymer is adsorbed strongly to cement particles that have positive charges, and therefore it cannot be expected to effectively disperse cement particles, either. Accordingly, the polymers as disclosed in the above-mentioned U.S. patents may have satisfactory performance as builders, but are not sufficient with regard to the dispersibility, because many carboxylate ions are arranged on the polymers.

In addition, none of the polymers as disclosed in the above-mentioned U.S. patents has a series of alkylene oxide groups. Therefore, when used as detergent builders, these polymers only display insufficient dispersibility, low washability, and inferior biodegradability.

SUMMARY OF THE INVENTION

A. Objects of the Invention

It is an object of the present invention to provide a new block copolymer which has a chemical structure different from those of the above-mentioned conventional polymers, and are excellent with regard to abilities such as dispersibility, chelatability, and scale inhibitability.

It is another object of the present invention to provide a cement dispersant and a pigment dispersant which are excellent with regard to dispersibility.

It is still another object of the present invention to provide a water-treating agent which is excellent with regard to dispersibility, chelatability, and scale inhibitability.

It is still another object of the present invention to provide a detergent builder which is excellent with regard to dispersibility and chelatability and has high washability and excellent biodegradability, and to provide a detergent composition containing this detergent builder.

It is still another object of the present invention to provide a process for producing the above-mentioned new block copolymer easily and efficiently.

B. Disclosure of the Invention

The present inventors studied the above-mentioned problems, and proposed a polymer which has a block structure of a polyether structural unit and a polycarboxylate structural unit which units have a polymerization degree of not less than a certain value to effectively display the workings of the polyether block moiety and polycarboxylate block moiety. Thus, the inventors completed the present invention.

A block copolymer, according to the present invention, includes:

a polyalkylene glycol structural unit of the following general formula (1):

(1)

wherein: n is an integer of 2 to 4; and x is a number of about 5 or more on average; and a polyglyoxylate structural unit of the following general formula (2):

(2)

wherein: M denotes one type selected from the group consisting of a hydrogen atom, alkyls with 1 to 4 carbon atoms, metal atoms of 1 to 3 in valency, ammonium groups, and organic amine groups; and y is a number of about 10 or more on average.

In the block copolymer identified immediately above, at least one terminal moiety may be selected from the group consisting of structures of the following general formulae (3) and (4):

(3)

wherein: n is an integer of 2 to 4; and $R^1$ denotes one type selected from the group consisting of a hydrogen atom, alkyls, alkenyls, alkylphenyls, phenyl, and benzyl; and

(4)

wherein: M denotes one type selected from the group consisting of a hydrogen atom, alkyls with 1 to 4 carbon atoms, metal atoms of 1 to 3 in valency, ammonium groups, and organic amine groups; and X denotes a group which is chemically stable to depolymerization of the block copolymer.

In general formula (1) mentioned above, x may be in a range of about 20 to about 500 on average.

In the block copolymer of the present invention having general formulae (1) and (2), a ratio by weight of the polyalkylene glycol structural unit to the polyglyoxylate structural unit may be in a range of about 2/8 to about 8/2.

In the block copolymer of the present invention having general formulae (1) and (2), the number-average molecular weight of the block copolymer may be in a range of about 2,000 to about 50,000.

In the block copolymer of the present invention having general formulae (1) and (2), one of the structural units may be designated A, and the other structural unit may be designated B, and the block copolymer may be selected from the group consisting of an AB type block copolymer, an ABA type block copolymer, and a copolymer having at least one AB type block, at least one ABA type block, and at least one BAB type block.

In general formula (4) mentioned above, X may be selected from the group consisting of alkyls, oxygen-containing alkyls, and oxygen-containing cycloalkyls.

In general formula (2) mentioned above, y may fall in a range of about 20 to about 500 on average.

The block copolymer of the present invention having general formulae (1) and (2) may be prepared by the below-mentioned production process of the present invention.

A cement dispersant, according to the present invention, includes the block copolymer of the present invention having general formulae (1) and (2).

A pigment dispersant, according to the present invention, includes the block copolymer of the present invention having general formulae (1) and (2).

A water-treating agent, according to the present invention, includes the block copolymer of the present invention having general formulae (1) and (2).

In the water-treating agent of the present invention, n may be 2.

A detergent builder, according to the present invention, includes the block copolymer of the present invention having general formulae (1) and (2).

The detergent builder of the present invention may be used for a liquid detergent composition.

A detergent composition, according to the present invention, includes a surfactant and the detergent builder of the present invention. In this detergent composition, the surfactant is at least one type selected from the group consisting of anionic surfactants, nonionic surfactants, cationic surfactants, and amphoteric surfactants, and the surfactant includes a concentration of about 10 to about 60% by weight of the detergent composition, and the detergent builder includes a concentration of about 0.1 to about 60% by weight of the detergent composition.

A process for producing a block copolymer, according to the present invention, includes the step of carrying out a polymerization reaction between:

a polyalkylene glycol of the following general formula (5):

$$R^1O\text{-}(C_nH_{2n}O)_x\text{-}H \tag{5}$$

wherein: $R^1$ denotes one type selected from the group consisting of a hydrogen atom, alkyls, alkenyls, alkylphenyls, phenyl, and benzyl; n is an integer of 2 to 4; and x is a number of about 5 or more on average; and a glyoxylic acid-based monomer of the following general formula (6):

$$\begin{array}{c} CHO \\ | \\ COOR^2 \end{array} \tag{6}$$

wherein $R^2$ denotes an alkyl with 1 to 4 carbon atoms; in the presence of a catalyst in a polymerization reaction system which has a water content of about 30 mol % or less relative to the polyalkylene glycol.

It is preferable that the process of the present invention further includes the step of carrying out a saponification reaction of the resultant block copolymer using an alkaline substance, whereby the water solubility of the copolymer is enhanced.

DETAILED DESCRIPTION OF THE INVENTION

Block copolymer

The block copolymer of the present invention has a polyalkylene glycol structural unit of the above-mentioned general formula (1) and a polyglyoxylate structural unit of the above-mentioned general formula (2).

The polyalkylene glycol structural unit is shown by general formula (1) and derived from a polyalkylene glycol. In general formula (1), n is an integer of 2 to 4, and x is a number of about 5 or more on average.

If n is an integer of 2 to 4, there is no especial limitation with regard to n, and the polyalkylene glycol structural unit may be any of a polyethylene glycol structural unit of n=2, a polypropylene glycol structural unit of n=3, and a polybutylene glycol structural unit of n=4. However, in the case where the copolymer is used in an aqueous system, a polyethylene glycol structural unit of n=2 is preferable for improving the water solubility of the copolymer.

There is no especial limitation with regard to the average value of x, provided that it is about 5 or more. In the case where x is less than about 5, the dispersibility or the scale inhibitability is not adequately displayed. The average value of x is preferably about 10 or more, and an average value of x of about 20 to about 1,000 is more preferable for obtaining more excellence with regard to dispersibility, chelatability, and scale inhibitability. The most preferable average value of x is in a range of about 20 to about 500.

The polyglyoxylate structural unit is shown by general formula (2) and derived from a polyglyoxylate. In general formula (2), M denotes one type selected from the group consisting of a hydrogen atom, alkyls with 1 to 4 carbon atoms, metal atoms of 1 to 3 in valency, ammonium groups ($NH_4$), and organic amine groups; and y is a number of about 10 or more on average.

Specific examples of the alkyl with 1 to 4 carbon atoms can be enumerated as follows: methyl, ethyl, n-propyl, iso-propyl, n-butyl, iso-butyl, sec-butyl, tert-butyl. These alkyls may be used alone or in combinations of at least two thereof.

Specific examples of the metal atom of 1 to 3 in valency can be enumerated as follows: lithium, sodium, potassium, magnesium, calcium, strontium, barium, aluminum, iron. These metal atoms may be used alone or in combinations of at least two thereof.

The organic amine group is not especially limited, provided that it is a group having a structure in which at least one of the groups bonded to its nitrogen atom is an organic group and which can form a salt with a carboxyl group. Specific examples of such an organic amine group can be enumerated as follows: alkyl amines with 1 to 4 carbon atoms, such as ethylamine, n-propylamine, isopropylamine, n-butylamine, sec-butylamine, tert-butylamine, allylamine, dimethylamine, diethylamine, triethylamine; other amines, such as dodecylamine, octadecylamine, cyclohexylamine, benzylamine, aniline, dipropylamine, dicyclohexylamine, N,N-dimethyldodecylamine; alkanolamines, such as monoethanolamine, diethanolamine, triethanolamine. These organic amines may be used alone or in combinations of at least two thereof.

M is preferably at least one type selected from the group consisting of: a hydrogen atom; metal atoms, such as sodium, potassium, magnesium, calcium; ammonium groups; and organic amine groups derived from organic amines, such as alkanol amines, alkylamines with 1 to 4 carbon atoms.

If M is an alkyl with 1 to 4 carbon atoms, the functional group (—COOM) in the polyglyoxylate structural unit of general formula (2) is an ester group. On the other hand, it is preferable that if M is one type selected from the group consisting of metal atoms of 1 to 3 in valency, ammonium groups and organic amine groups, then the functional group (—COOM) in the polyglyoxylate structural unit of general formula (2) is a carboxylic acid salt group which produces affinity with substances positively charged by electrostatic action and thereby enhances the chelatability and the scale inhibitability. The ester group can easily be converted into the carboxylic acid salt group by the below-mentioned method.

The average value of y is not especially limited, provided it is about 10 or more. However, in the case where y is less than about 10, the improvement of the chelatability and the dispersibility, which improvement is not effected from the polyalkylene glycol structural unit, cannot be adequately obtained. The average value of y is preferably about 20 or more for the excellence in the performance, such as chelatability, dispersibility, scale inhibitability, and more preferably in a range of about 20 to about 500.

The ratio of the combination of the polyalkylene glycol structural unit and the polyglyoxylate structural unit in the block copolymer is not especially limited, but the ratio by weight of polyalkylene glycol structural unit/polyglyoxylate structural unit is preferably in a range of about 1/9 to about 9/1, more preferably, about 2/8 to about 8/2, because the excellent performance of a block copolymer with such a structural unit ratio is even better than the excellent performance of a homopolymer consisting of the respective structural unit alone.

The number-average molecular weight of the block copolymer is preferably in a range of about 1,500 to about 1,000,000, more preferably, about 2,000 to about 50,000. In the case where the number-average molecular weight is out of these ranges, effects such as dispersibility which are produced by a block copolymer might not be adequately obtained.

The arrangement of each structural unit of the block copolymer is not especially limited, provided that the block copolymer contains the polyalkylene glycol structural unit (which hereinafter may be referred to as "A") and the polyglyoxylate structural unit (which hereinafter may be referred to as "B"). However, the arrangement can roughly be classified into the following ones (1) to (4):

(1) AB type block copolymer;
(2) BAB type block copolymer;
(3) ABA type block copolymer; and
(4) block copolymer in which arrangements (1) to (3) above are repeated.

The structures of the terminal moieties of the polymer are not especially limited, but it is preferable that a structure of at least one terminal moiety of the polymer is selected from structures of general formulae (3) and (4), because a polymer having such a structure is more stable and therefore possesses excellent handling properties. In the case where a terminal of the repeated moieties of the polymer is a polyalkylene glycol structural unit, the structure of general formula (3) (which hereinafter may be referred to as "terminal structure a") is a structure of a terminal moiety of the polymer. In addition, in the case where a terminal of the repeated moieties of the polymer is a polyglyoxylate structural unit, the structure of general formula (4) (which hereinafter may be referred to as "terminal structure b") is a structure of a terminal moiety of the polymer.

Structures of one terminal moiety and of the other terminal moiety of the polymer may be shown by either the same or different general formulae selected from general formulae (3) and (4). In addition, when the structures of one terminal moiety and of the other terminal moiety of the polymer are shown by the same general formula, the structures of these terminal moieties may be either the very same structures as each other or those which are shown by the same general formula, but are not the very same structures as each other. In other words, a given copolymer may have terminal moieties of different general formulae. Further, a given copolymer having terminal moieties of the same general formula may have terminal moieties which are different from each other.

In terminal structure a, n is an integer of 2 to 4, and $R^1$ is one type selected from the group consisting of a hydrogen atom, alkyls, alkenyls, alkylphenyls, phenyl, and benzyl, wherein $R^1$ other than a hydrogen atom may be a substituted group.

Specific examples of the alkyl used as $R^1$ can be enumerated as follows: methyl, ethyl, propyl, n-butyl, iso-butyl, lauryl, stearyl. These alkyls may be used alone or in combinations of at least two thereof.

Specific examples of the alkenyl used as $R^1$ are propenyl and butenyl. These alkenyls may be used alone or in combinations of at least two thereof.

Specific examples of the alkylphenyl used as $R^1$ can be enumerated as follows: toluyl, xylyl, dodecylphenyl, nonylphenyl. These alkylphenyls may be used alone or in combinations of at least two thereof.

In terminal structure b, M is one type selected from the group consisting of a hydrogen atom, alkyls with 1 to 4 carbon atoms, metal atoms of 1 to 3 in valency, ammonium groups, and organic amine groups, and X is a group which is chemically stable to depolymerization of the block copolymer. The group, which is chemically stable to depolymerization, is an optional group that is chemically stable to rapid depolymerization in an alkaline solution.

As to M, the ones that are previously exemplified can be used, and preferable ones are also the same as those mentioned previously.

X is a group which displays preferably less than a about 50% ratio of decrease in the average chain length of the polyglyoxylate structural unit in the block copolymer at 20° C. in 1 hour in a 0.5M aqueous sodium hydroxide solution containing 10 g/l of the block copolymer, with the average chain length measured by NMR.

Preferable group X can be exemplified by alkyls, oxygen-containing alkyls, oxygen-containing cycloalkyls.

Specific examples of the alkyl can be enumerated as follows: methyl, ethyl, propyl, lauryl, stearyl.

Specific examples of the oxygen-containing alkyl can be enumerated as follows: alkyls having carboxyl, such as —$CH_2COOM^1$, —$CR^3(COOM^1)_2$, —$CH(COOM^1)[CH(OH)COOM^1]$, —$CH(OCH_2CH_3)[CH(COOM^1)_2]$ (wherein $M^1$ is one type selected from the group consisting of alkaline-metal atoms, ammonium groups, alkanolamine groups, and alkyls with 1 to 4 carbon atoms; and $R^3$ is one type selected from a hydrogen atom and alkyls with 1 to 8 carbon atoms); alkyls having an ether group, such as —$CHCH_3OCH_2CH_3$, —$(CH_2CH_2O)_{1-4}H$; an aldehyde group and other oxygen-containing alkyls; and acyls of the following general formula (7):

 (7)

wherein $R^1$ is one type selected from the group consisting of a hydrogen atom, alkyls, alkenyls, alkylphenyls, phenyl, and benzyl; and the previously exemplified ones can be used as $R^1$ in the acyl.

Specific examples of the oxygen-containing cycloalkyl is a group of the following formula (8):

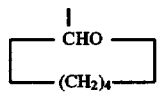 (8)

X as mentioned above may be used alone or in combinations of at least two thereof.

The above-explained block copolymer can preferably be used for cement dispersants, water-treating agents, and pigment dispersants.

Process for producing block copolymer

A process of the present invention for producing a block copolymer is characterized by the step of allowing a glyoxylic acid-based monomer of the aforementioned general formula (6) to react upon a polyalkylene glycol of the aforementioned general formula (5) by polymerization in the presence of a catalyst in a polymerization reaction system which has a water content of about 30 mol % or less relative to the polyalkylene glycol.

The polyalkylene glycol is shown by general formula (5) and, for example, can be obtained by polymerizing an alkylene oxide in the presence of a polymerization catalyst. $R^1$ in the polyalkylene glycol is one type selected from the group consisting of a hydrogen atom, alkyls, alkenyls, alkylphenyls, phenyl, and benzyl, and n is an integer of 2 to 4, and the average value of x is about 5 or more, and details of these parameters with regard to the polyalkylene glycol are the same as explained in the preceding item on the block copolymer in this specification. Preferable ones are also the same as previously mentioned. In addition, if $R^1$ is a hydrogen atom, the polyalkylene glycol has hydroxyl at both terminal moieties, and the polymerization of the below-mentioned glyoxylic acid-based monomer is initiated from both terminal moieties of the polyalkylene glycol. Furthermore, if $R^1$ is a type other than an hydrogen atom, the polyalkylene glycol has hydroxyl at one terminal moiety and an ether group at the other terminal moiety, and the polymerization of the glyoxylic acid-based monomer is initiated from the one terminal moiety, to which hydroxyl is bonded, of the polyalkylene glycol.

The glyoxylic acid-based monomer is an glyoxylic acid alkyl ester of general formula (6), and $R^2$ therein is an alkyl with 1 to 4 carbon atoms.

Specific examples of the alkyl with 1 to 4 carbon atoms, used as $R^2$, are methyl, ethyl, n-propyl, iso-propyl, n-butyl, iso-butyl, sec-butyl, tert-butyl. These alkyls may be used alone or in combinations of at least two thereof.

The ratio of the combination of the polyalkylene glycol and the glyoxylic acid-based monomer is not especially limited, but the ratio of polyalkylene glycol/glyoxylic acid-based monomer being about 1/9 to about 9/1 (w/w) is preferable in that a polymer having such a ratio displays better performance than a polymer obtained by polymerizing each monomer alone, and the more preferable ratio is in a range of about 2/8 to about 8/2.

The production of the block copolymer is carried out in the presence of a catalyst. The catalyst is not especially limited, but a specific example thereof is one type selected from the group consisting of cationic polymerization catalysts and anionic ones.

Specific examples of the cationic polymerization catalyst are trifluoroboron etherate ($BF_3.Et_2O$), trifluoroacetic acid, hydrochloric acid, sulfuric acid, phosphoric acid, phosphorus pentaoxide.

Specific examples of the anionic polymerization catalyst are as follows: organometallic compounds, such as diethylzinc, n-butyllithium; alkaline-metal compounds, such as potassium hydroxide, sodium hydroxide, calcium hydroxide, magnesium hydroxide; amines, such as triethylamine, N,N-dimethyldodecylamine; sodium methyl malonate ester; alkaline-metal alkoxides, such as sodium methoxide, potassium methoxide.

Generally, the anionic polymerization catalyst is preferable for the production of the block copolymer in that the number-average molecular weight of the resultant polymer is easy to control.

The amount of the catalyst as used is not especially limited and depends upon the type of the catalyst. However, for example, the amount of the amine catalyst is preferably in a range of about 0.001 to about 10% by weight of the monomers.

The reaction temperature during the production of the block copolymer depends upon reaction conditions and is appropriately determined depending upon the type of the catalyst or solvent, but the production is usually carried out in a range of about −50° to about 50° C. At a temperature lower than about −50° C., cooling is difficult. At a temperature higher than about 50° C., the yield of the resultant block copolymer decreases.

The production process for the block copolymer may be carried out either by solution polymerization with a solvent or by bulk polymerization without any solvents. In addition, the solution polymerization can be carried out by either a batch or continuous manner.

The solvent used in the solution polymerization is not especially limited, provided the solvent satisfies conditions, for example, where the solvent is miscible with the polyalkylene glycol and the glyoxylic acid-based monomer, which are used in the reaction, and with the block copolymer resultant from the reaction, and where the solvent does not take part in an undesirable side reaction. Specific examples of such a solvent are as follows: aromatic hydrocarbons, such as benzene, toluene, xylene; aliphatic hydrocarbons, such as cyclohexane, n-hexane; hydrocarbon halides, such as methylene chloride; ester compounds, such as methyl acetate, ethyl acetate; ketone compounds, such as acetone; ether compounds, such as tetrahydrofuran, dioxane. Of these solvents, at least one type selected from the group consisting of toluene, methyl acetate, dioxane, and acetone is preferable with regard to the ability to dissolve the reactants and the product and with regard to the convenience during use.

In addition, the amount of the solvent as used is preferably in a range of about 10 to about 2,000 parts by weight per 100 parts by weight of the resultant copolymer not only for the productivity, but also in that side reactions can be inhibited. However, the reaction may be carried out without any solvents, provided the polyalkylene glycol is liquid at the reaction temperature.

In the production process for the block copolymer, the polymerization reaction is carried out in a polymerization reaction system which has a water content of about 30 mol % or less, preferably about 10 mol % or less, more preferably about 1 mol % or less, relative to the polyalkylene glycol, and most preferably in a water-free system. In the case where the water content is too high, the production amount of a homopolymer, which is a by-product, of the glyoxylic acid-based monomer increases and therefore the yield of the aimed block copolymer decreases. Thus, it is preferable that the polyalkylene glycol, the glyoxylic acid-based monomer, and the solvent which is used if need arises are dehydrated before initiating the polymerization reaction. The method for dehydration is not especially limited, but examples thereof are azeotropic dehydration and addition of a dehydrator.

In the production process for the block polymer, the arrangement of each structural unit in the resultant block copolymer depends upon a structure of a terminal moiety of the polyalkylene glycol.

If $R^1$ in the polyalkylene glycol is a hydrogen atom, the polyalkylene glycol has hydroxyl at both terminal moieties, and the polymerization of the glyoxylic acid-based monomer is initiated from both terminal moieties of the polyalkylene glycol to give a BAB block copolymer in which the structural units are arranged in the aforementioned order of B, A, B. If the resultant BAB block copolymer is allowed to further react with an alkylene oxide of the following general formula (9):

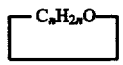
(9)

wherein n is an integer of 2 to 4 without converting a terminal moiety of the BAB block copolymer into a chemically stable group, an ABABA block copolymer is obtained in which the structural units are arranged in the aforementioned order of A, B, A, B, A. Furthermore, if the resultant ABABA block copolymer is allowed to further react with the glyoxylic acid-based monomer by polymerization, a BABABAB block copolymer is obtained in which the structural units are arranged in the aforementioned order of B, A, B, A, B, A, B. An optional block copolymer can be produced by repeating such a polymerization reaction.

As to n in general formula (9), ethylene oxide of n=2 is preferable because its solubility is good when used in an aqueous system.

If $R^1$ in the polyalkylene glycol is a type other than a hydrogen atom, the polyalkylene glycol has hydroxyl at only one terminal moiety, and the polymerization of the glyoxylic acid-based monomer is initiated only from the one terminal moiety of the polyalkylene glycol to give an AB block copolymer in which the structural units are arranged in the aforementioned order of A, B. If the resultant AB block copolymer is allowed to further react with an alkylene oxide of the above-mentioned general formula (9) without converting the B terminal moiety of the AB block copolymer into a chemically stable group (wherein because $R^1$ is a type other than a hydrogen atom, the A terminal moiety of the AB block copolymer has an ether bond and therefore does not participate in the reaction), then an ABA block copolymer is obtained in which the structural units are arranged in the aforementioned order of A, B, A. Furthermore, if the resultant ABA block copolymer is allowed to further react with the glyoxylic acid-based monomer by polymerization, an ABAB block copolymer is obtained in which the structural units are arranged in the aforementioned order of A, B, A, B. An optional block copolymer can be produced by repeating such a polymerization reaction. Also in this case, as to n in general formula (9), ethylene oxide of n=2 is preferable because its solubility is good when used in an aqueous system.

The reaction conditions for reacting the block copolymer having the B terminal moiety with the alkylene oxide of general formula (9) by polymerization and the reaction conditions for reacting the block copolymer having the A terminal moiety with the glyoxylic acid-based monomer by polymerization are both the same as those aforementioned in detail with regard to the production process for the block copolymer, and the preferable ones are also the same as mentioned previously as to such production process for such block copolymer.

In the case where a terminal moiety of the block copolymer obtained in this way is B, it is preferable that this terminal moiety is converted into a group stable to depolymerization in that the resultant block copolymer becomes stable. In addition, in the case where the terminal moiety is A, the terminal moiety does not especially need to be converted into another group, but may be converted into a group stable to the depolymerization.

An example of the method for converting the terminal moiety into a group stable to depolymerization is a method in which a block copolymer having a B terminal moiety is reacted with a reactive compound.

Specific examples of the reactive compound are as follows: alkyl vinyl ethers, such as ethyl vinyl ether, butyl vinyl ether, propyl vinyl ether; substituted olefins, such as propylene, butylene, methyl acrylate; epoxides, such as ethylene oxide, propylene oxide, epichlorohydrin; alcohols, such as methanol, ethanol, propyl alcohol; alkyl halides, such as methyl iodide, iso-propyl chloride, tert-butyl chloride; allyl halides, such as allyl chloride; acetals, such as acetaldehyde dimethylacetal; alkyl sulfates, such as dimethyl sulfate, diethyl sulfate; benzyl halides, such as benzyl chloride, benzyl bromide. These reactive compounds may be used alone or in combinations of at least two thereof.

The amount of the reactive compound as used is not especially limited, but the amount is preferably in a range of about 1.1 to about 10, in terms of molar ratio, relative to the block copolymer having a B terminal moiety.

Specific examples of the reaction catalyst are as follows: protonic acids, such as hydrochloric acid, hydrobromic acid, hydroiodic acid, trifluoroacetic acid, phosphoric acid; Lewis acids, such as aluminum chloride, alkylaluminum halides, trialkylaluminums. These reaction catalysts may be used alone or in combinations of at least two thereof.

The amount of the reaction catalyst as used is not especially limited, and is appropriately determined depending upon the type of the reaction catalyst.

In the reaction with the reactive compound, the same solvent that is used in producing the block copolymer can be used. In addition, the reaction is preferably carried out in a temperature range of about 0° to about 50° C.

The glyoxylic acid-based monomer used in the production process for the block copolymer is a glyoxylic acid alkyl ester and therefore has a structure in which an ester group is pendent from the principal chain of the copolymer. This ester itself can also be used for the below-mentioned various purposes, but it is preferable that the resultant block copolymer is then saponified with an alkaline substance to convert the ester group into a carboxylic acid salt group, because the block copolymer thereby becomes highly soluble in water when used in an aqueous system.

Specific examples of the alkaline substance are hydroxides of metals with a valence of 1 to 3, such as potassium hydroxide, sodium hydroxide, calcium hydroxide. These alkaline substances may be used alone or in combinations of at least two thereof.

The amount of the alkaline substance as used is not especially limited, but the amount is preferably in a range of about 1.0 to about 2.0, more preferably about 1.1 to about 1.5, in terms of molar ratio, relative to the glyoxylic acid-based monomer used in the polymerization reaction.

The saponification reaction is preferably carried out at a temperature of about 0° to about 100° C., more preferably about 20° to about 70° C., by adding the block copolymer into an aqueous solution containing the alkaline substance.

The 1- to 3-valent metal carboxylate group obtained by the saponification reaction can easily be converted into an ammonium carboxylate group or a carboxylic acid amine salt group by methods such as ion exchange methods. For example, salt exchange is carried out by mixing strong acid salts such as amine hydrochlorates and, if necessary, then the resultant inorganic salt may be removed.

Uses of block copolymer

[Cement dispersant]

The cement dispersant includes the aforementioned block copolymer.

The block copolymer included in the cement dispersant is not especially limited, provided the copolymer is the aforementioned one. However, the ratio of the combination of the polyalkylene glycol structural unit and the polyglyoxylate structural unit in the block copolymer [polyalkylene glycol structural unit/polyglyoxylate structural unit (ratio by weight)] is preferably about 30/70 or more in that the amount of the block copolymer as added can be decreased and the viscosity also can be decreased. In addition, the polyalkylene glycol structural unit is preferably a polyethylene glycol structural unit in that the block copolymer having this structural unit is excellent in the water solubility. Furthermore, the number-average molecular weight of the block copolymer included in the cement dispersant is preferably in a range of about 2,000 to about 50,000.

The average number of the alkylene glycol structural units composing the polyalkylene glycol structural unit of the block copolymer in the cement dispersant, namely, the average value of x in general formula (1), is not especially limited, provided it is about 5 or more. However, an average value of x of about 10 to about 80 is preferable for the improvement of the fluidity of cement, and a more preferable average value of x is in a range of about 20 to about 60. In addition, the average number of the glyoxylate structural units composing the polyglyoxylate structural unit of the block copolymer in the cement dispersant, namely, the average value of y in general formula (2), is not especially limited, provided it is about 10 or more. However, an average value of y of about 10 to about 100 is preferable for the decrease of the amount of the block copolymer as added, and a more preferable average value of y is in a range of about 20 to about 50.

If the above-mentioned cement dispersant is used for cement compositions such as cement mortar and concrete, the block copolymer displays the ability to improve the performance of the cement compositions as follows: the dispersibility can be improved, the fluidity can be enhanced, and the setting time can be lengthened, without bringing about great retardment of the setting because of addition of the cement dispersant, whereby the workability of construction using mortar or concrete is greatly improved. Accordingly, this cement dispersant, for example, can be used as a fluidizing agent for concrete such as ready-mixed concrete. Particularly, this cement dispersant serves as a plant-simultaneously-added type high performance AE (air-entraining) water-reducing additive to easily enable the production of ready-mixed concrete having the composition of a high water-reducing ratio.

The cement dispersant, for example, can be used for dispersing hydraulic cement, such as portland cement, alumina cement, various types of mixed cement, and for dispersing hydraulic materials other than cement, such as plaster.

The ratio of the combination of the cement dispersant to cement is not especially limited, but the amount of the cement dispersant is preferably in a range of about 0.01 to about 1.0 parts by weight relative to 100 parts by weight of cement.

Examples of methods for using the cement dispersant are: a method in which the cement dispersant is dissolved into knead-mixing water and then added simultaneously with knead-mixing water in preparing a cement composition; and a method in which the cement dispersant is added to an already kneaded cement composition.

The cement dispersant can also be used as a high performance water-reducing additive for producing secondary concrete products, and can reduce the water content and therefore enhance the strength.

[Pigment dispersant]

The pigment dispersant includes the aforementioned block copolymer.

The block copolymer included in the pigment dispersant is not especially limited, provided it is the aforementioned block copolymer. The pigment dispersant includes the block copolymer as the essential component and may further include other components.

The pigment dispersant is used for dispersing pigments, such as kaolin, clay, calcium carbonate, titanium oxide, barium sulfate, satin white, magnesium hydroxide, into water.

The average number of the alkylene glycol structural units composing the polyalkylene glycol structural unit of the block copolymer in the pigment dispersant, namely, the average value of x in general formula (1), is not especially limited, provided it is about 5 or more. However, an average value of x of about 5 to about 30 is preferable for lowering the viscosity of a pigment slurry, and a more preferable average value of x is in a range of about 8 to about 20. In addition, the average number of the glyoxylate structural units composing the polyglyoxylate structural unit of the block copolymer in the pigment dispersant, namely, the average value of y in general formula (2), is not especially limited, provided it is about 10 or more. However, an average value of y of about 10 to about 200 is preferable for improving the stability with time of the viscosity of a pigment slurry, and a more preferable average value of y is in a range of about 20 to about 50.

The ratio of the combination of the pigment dispersant to pigment is not especially limited, but the amount of the cement dispersant is preferably in a range of about 0.01 to about 1.0 parts by weight relative to 100 parts by weight of pigment.

Because of inclusion of the block copolymer, the pigment dispersant can produce a dispersion that is excellent in dispersibility and has a low viscosity even in a high concentration and is excellent in stability. Therefore the pigment dispersant can particularly favorably be used as a dispersant used for dispersing pigments for paper, and also can widely be applied in fields such as fiber processing, building material processing, coatings, ceramics.

[Water-treating agent]

The water-treating agent includes the aforementioned block copolymer.

The block copolymer included in the water-treating agent is not especially limited, provided it is the aforementioned block copolymer. The water-treating agent includes the block copolymer as the essential component and may further include other components.

The water-treating agent is excellent in chelatability and scale inhibitability due to the block copolymer, and therefore can be used for inhibiting formation of scale in systems, such as cooling water-circulating systems, boiler water-circulating systems, seawater desalination plants, pulp digestors, black liquor evaporators.

The average number of the alkylene glycol structural units composing the polyalkylene glycol structural unit of the block copolymer in the water-treating agent, namely, the average value of x in general formula (1), is not especially limited, provided it is about 5 or more. However, an average value of x of about 5 to about 20 is preferable for improving the gelation resistance of the water-treating agent, and a more preferable average value of x is in a range of about 8 to about 18. In addition, the average number of the glyoxylate structural units composing the polyglyoxylate structural unit of the block copolymer in the water-treating agent, namely, the average value of y in general formula (2), is not especially limited, provided it is about 10 or more. However, an average value of y of about 10 to about 100 is preferable for inhibiting the formation of calcium scale, and a more preferable average value of y is in a range of about 15 to about 50.

The ratio of the combination of the water-treating agent to water is not especially limited, but the amount of the water-treating agent is preferably in a range of about 1 to about 100 mg per liter of water.

[Detergent builder and detergent composition]

The detergent builder includes the aforementioned block copolymer.

The detergent builder includes the block copolymer as the essential component, and may further include other components, such as other acetal-based polymers, vinylic polymers.

The detergent builder is a component that is added to the below-mentioned detergent composition together with a surfactant, and is excellent with regard to dispersibility and chelatability, and has high washability and excellent biodegradability. The detergent builder serves to maintain a pH of an aqueous solution containing a detergent composition at a constant value, to scavenge components, such as a calcium ion, in the aqueous solution, to disperse dirt, as removed from objects being washed, into water, and to prevent the dirt from attaching again to the objects being washed.

If the block copolymer in the detergent builder is a block copolymer of the present invention, the form of the detergent composition may be either liquid or powdered and therefore is not especially limited. However, the detergent builder is preferably used for a liquid detergent composition, because the detergent builder has excellent compatibility with the surfactant and therefore gives a high concentrated liquid detergent composition.

When the detergent composition is a liquid one, the average number of the alkylene glycol structural units composing the polyalkylene glycol structural unit of the block copolymer in the detergent builder used for the detergent composition, namely, the average value of x in general formula (1), is not especially limited, provided it is about 5 or more. However, an average value of x of about 5 to about 20 is preferable for dispersing mud dirt components, and a more preferable average value of x is in a range of about 8 to about 18, and the most preferable one is in a range of about 10 to about 15. In addition, the average number of the glyoxylate structural units composing the polyglyoxylate structural unit of the block copolymer in the detergent builder used for the detergent composition, namely, the average value of y in general formula (2), is not especially limited, provided it is about 10 or more. However, an average value of y of about 10 to about 200 is preferable for enhancing the compatibility, and a more preferable average value of y is in a range of about 30 to about 100, and the most preferable one is in a range of about 50 to about 80.

In addition, when the detergent composition is a powdered one, the average number of the alkylene glycol structural units composing the polyalkylene glycol structural unit of the block copolymer in the detergent builder used for the detergent composition, namely, the average value of x in general formula (1), is not especially limited, provided it is about 5 or more. However, an average value of x of about 5 to about 20 is preferable for enhancing the dispersibility to mud dirt, and a more preferable average value of x is in a range of about 8 to about 18, and the most preferable one is in a range of about 10 to about 15. In addition, the average number of the glyoxylate structural units composing the polyglyoxylate structural unit of the block copolymer in the detergent builder used for the detergent composition, namely, the average value of y in general formula (2), is not especially limited, provided it is about 10 or more. However, an average value of y of about 30 to about 500 is preferable for enhancing the chelatability, and a more preferable average value of y is in a range of about 60 to about 400, and the most preferable one is in a range of about 80 to about 400.

The reason why, as above-mentioned, the preferable range of y of the block copolymer in the detergent builder for the liquid detergent composition is less than that for the powdered detergent composition is because the glyoxylate structural unit is relatively sparingly soluble in water, and because a large value of y therefore makes the liquid detergent composition difficult to use. In addition, the reason is also because while a surfactant added to the powdered detergent composition is mainly anionic, a surfactant added to the liquid detergent composition is mainly nonionic, and because the detergent performance is measurable even if the number of the glyoxylate structural units composing the polyglyoxylate structural unit is small.

The detergent composition includes a surfactant and the above-mentioned detergent builder as the essential components, and, as needed, may further include the below-mentioned other components.

The surfactant is at least one type selected from the group consisting of anionic surfactants, nonionic surfactants, cationic surfactants, and amphoteric surfactants. These surfactants may be used alone or in combinations of two or more thereof.

Specific examples of the anionic surfactant are alkylbenzenesulfonic acid salts, alkyl or alkenyl ether sulfuric acid salts, alkyl- or alkenylsulfuric acid salts, α-olefinsulfonic acid salts, α-sulfofatty acids or ester salts thereof, alkanesulfonic acid salts, saturated or unsaturated fatty acid salts, alkyl or alkenyl ether carboxylic acid salts, amino acid type surfactants, N-acylamino acid type surfactants, alkyl- or alkenylphosphoric acid esters or salts thereof.

Specific examples of the nonionic surfactant are polyoxyalkylene alkyl or alkenyl ethers, polyoxyethylene alkyl phenyl ethers, higher fatty acid alkanolamides or alkylene oxide adducts thereof, sucrose fatty acid esters, alkyl glycoxides, fatty acid glycerol monoesters, alkylamine oxides.

Specific examples of the cationic surfactant thereof are quaternary ammonium salts.

Specific examples of the amphoteric surfactant are carboxyl type or sulfobetaine type amphoteric surfactants.

The concentration of the surfactant in the detergent composition is usually in a range of about 10 to about 60% by weight, preferably, about 15 to about 50% by weight, of the detergent composition. In the case where the concentration of the surfactant is less than about 10% by weight, sufficient washability cannot be displayed. On the other hand, in the case where the concentration of the surfactant is more than about 60% by weight, there is no problem on the performance, but economic disadvantage is involved.

The concentration of the detergent builder in the detergent composition is usually in a range of about 0.1 to about 60% by weight, preferably, about 3 to about 30% by weight, of the detergent composition. In the case where the concentration of the detergent builder is less than about 0.1% by weight, sufficient washability cannot be displayed. On the other hand, in the case where the concentration of the detergent builder is more than about 60% by weight, there is no problem on the performance, but economic disadvantage is involved.

When desired, the detergent composition can further include other components, for example, enzymes (e.g. protease, (alkali) lipase, (alkali) cellulase), alkali builders (e.g. silicates, carbonates, sulfates), chelate builders (e.g. diglycolic acid, oxycarboxylates, EDTA (ethylenediaminetetraacetate), DTPA (diethylenetriaminehexaacetate), citric acid), reattachment inhibitors, fluorescent agents, bleachers, perfumes, zeolite, in addition to the surfactant and the detergent builder. These other components may be used alone or in combinations of two or more thereof.

Of the enzymes, alkali lipase and alkali cellulase are particularly preferable, because they are high active in alkali washing liquids. The concentration of the enzyme in the detergent composition is usually in a range of about 0.01 to about 5% by weight of the detergent composition. In the case where the enzyme concentration is less than 0.01% by weight, sufficient washability cannot be displayed. In the case where the enzyme concentration is more than 5% by weight, there is no problem on the performance, but economic disadvantage is involved.

In addition, the block copolymer is also useful as various materials, such as binders for ceramic, fiber-treating agents, flocculants, besides the above-mentioned uses.

(Advantages of the invention)

Because the block copolymer of the present invention has a polyalkylene glycol structural unit of general formula (1) and a polyglyoxylate structural unit of general formula (2), this copolymer can provide a new block copolymer that is excellent with regard to abilities such as dispersibility, chelatability, and scale inhibitability.

If a structure of at least one terminal moiety of the polymer is selected from the group consisting of structures of general formulae (3) and (4), the stability of the polymer is enhanced and handling-properties of the polymer are excellent.

Because the cement- and pigment dispersants of the present invention both include the block copolymer, they are excellent with regard to dispersibility.

Because the water-treating agent of the present invention includes the block copolymer, this agent is excellent with regard to dispersibility, chelatability, and scale inhibitability. regard to dispersibility.

Because the detergent builder and the detergent composition of the present invention both include the block copolymer, they are excellent with regard to dispersibility and chelatability and has high washability and excellent biodegradability.

As aforementioned, the present invention process for producing a block copolymer includes the step of carrying out a polymerization reaction between a polyalkylene glycol of general formula (5) and a glyoxylic acid-based monomer of general formula (6) in the presence of a catalyst in a polymerization reaction system which has a water content of about 30 mol % or less relative to the polyalkylene glycol. Therefore, this process can easily and efficiently produce a new block copolymer that is excellent with regard to abilities such as dispersibility, chelatability, and scale inhibitability.

If the resultant block copolymer is then saponified with an alkaline substance, the block copolymer becomes more water-soluble, and effects from the water-solubility are enhanced.

DETAILED DESCRIPTION OF THE PREFERRED EMBODIMENTS

Hereinafter, the present invention is more specifically illustrated by the following examples of some preferred embodiments in comparison with comparative examples not according to the invention. However, the present invention is not limited to these examples.

EXAMPLE A1

First, 80 ml of toluene, 33 g of polyethylene glycol monomethyl ether (molecular weight: 4,400), and 12 µl of pyridine as a polymerization catalyst were supplied into a glass-made reaction vessel equipped with a stirrer, a thermometer, a nitrogen gas introducing tube, a condenser, and a dropping funnel. Next, 35 g of freshly distilled methyl glyoxylate was dropwise added into the reaction vessel over a period of 30 minutes, with the reaction temperature controlled to not higher than about 40° C. by cooling the reaction vessel.

The resultant reaction mixture was cooled to 20° C., and 0.03 g of trifluoroboron etherate was then added to the reaction mixture and completely dissolved by stirring for 10 minutes. Next, a mixed liquid of 1.0 g of ethylene oxide and 10 ml of toluene was dropwise added to the reaction mixture over a period of 30 minutes. After the addition had finished, the reaction mixture was further stirred for 60 minutes to thereby produce a stabilized ester polymer. The above-mentioned operations were all carried out under water-free conditions under nitrogen atmosphere.

A saponification reaction was carried out by adding sodium hydroxide of 1.2 times by mol of the preceding methyl glyoxylate, as used for the polymerization, into the reaction solution containing the resultant stabilized ester polymer. Toluene and methanol were then removed from the resultant solution of a product, thus obtaining an aqueous polymer solution containing block copolymer 1.

Block copolymer 1 was analyzed by gel permeation chromatography (hereinafter abbreviated to GPC). As a result, the peak of the polyethylene glycol monomethyl ether, as used as a starting material of the reaction, disappeared, and instead a new peak was recognized on a high molecular side, and the number-average molecular weight of block copolymer 1 was 9,000. In addition, results from measuring $^1$H-NMR and IR spectra of block copolymer 1 were as follows:

$^1$H-NMR (δ value, solvent: heavy water)
3.4–3.8 (7H)
4.9–5.2 (1H)
(The number of protons shows the respective ratios.)
IR spectrum 2,880; 2,740; 1,630 (carboxylate); 1,430 (carboxylate); 1,300; 1110 (ether bond, acetal bond); 940; 840; 680; 520 cm$^{-1}$

EXAMPLE A2

A reaction was carried out in the same way as of Example A1 except that the amount of methyl glyoxylate as used was changed from 35 g to 18 g, thus obtaining an aqueous polymer solution containing block copolymer 2. Block copolymer 2 was analyzed by GPC. As a result, the peak of the polyethylene glycol monomethyl ether, as used as a starting material of the reaction, disappeared, and instead a new peak was recognized on a high molecular side. The number-average molecular weight of block copolymer 2 is shown in Table 1.

EXAMPLE A3

First, 80 ml of toluene, 30 g of polyethylene glycol (molecular weight: 3,000), and 16 μl of pyridine as a polymerization catalyst were supplied into a glass-made reaction vessel equipped with a stirrer, a thermometer, a nitrogen gas introducing tube, a condenser, and a dropping funnel. Next, 55 g of freshly distilled methyl glyoxylate was dropwise added into the reaction vessel over a period of 30 minutes. The subsequent operations were carried out in the same way as of Example A1, thus obtaining an aqueous polymer solution containing block copolymer 3. Block copolymer 3 was analyzed by GPC. As a result, the peak of the polyethylene glycol, as used as a starting material of the reaction, disappeared, and instead a new peak was recognized on a high molecular side. The number-average molecular weight of block copolymer 3 is shown in Table 1.

EXAMPLE A4

A reaction was carried out in the same way as of Example A1 except that polyethylene glycol monomethyl ether was replaced with polyethylene glycol monophenyl ether (molecular weight: 1,000), and that the amount of methyl glyoxylate as used was changed to 18 g, thus obtaining an aqueous polymer solution containing block copolymer 4. Block copolymer 4 was analyzed by GPC. As a result, the peak of the polyethylene glycol monophenyl ether, as used as a starting material of the reaction, disappeared, and instead a new peak was recognized on a high molecular side. The number-average molecular weight of block copolymer 4 is shown in Table 1.

EXAMPLE A5

A reaction was carried out in the same way as of Example A1 except that polyethylene glycol monomethyl ether was replaced with polyethylene glycol monoalkyl ether (molecular weight: 500; number of carbon atoms of alkyl moiety: 12 to 15), and that the amount of methyl glyoxylate as used was changed to 18 g, thus obtaining an aqueous polymer solution containing block copolymer 5. Block copolymer 5 was analyzed by GPC. As a result, the peak of the polyethylene glycol monoalkyl ether, as used as a starting material of the reaction, disappeared, and instead a new peak was recognized on a high molecular side. The number-average molecular weight of block copolymer 5 is shown in Table 1.

EXAMPLE A6

A reaction was carried out in the same way as of Example A1 except that polyethylene glycol monomethyl ether was replaced with polyethylene glycol mononaphthoxy ether (molecular weight: 420), and that the amount of methyl glyoxylate as used was changed to 60 g, thus obtaining an aqueous polymer solution containing block copolymer 6. Block copolymer 6 was analyzed by GPC. As a result, the peak of the polyethylene glycol mononaphthoxy ether, as used as a starting material of the reaction, disappeared, and instead a new peak was recognized on a high molecular side. The number-average molecular weight of block copolymer 6 is shown in Table 1.

COMPARATIVE EXAMPLE A1

First, 100 g of methyl glyoxylate methyl hemiacetal and 160 g of phosphorus pentaoxide were placed into a 500 ml round-bottom flask equipped with an efficient stirrer and a heater. The contents of the flask were heated to 100° C. while stirred for 1 hour and then allowed to cool to room temperature. The resultant aldehyde ester was recovered from the residual phosphorus pentaoxide by distillation and stored in a glass stoppered bottle.

Next, 10 g of freshly distilled aldehyde ester, as prepared above, and 4 ml of methylene chloride were placed into a 100 ml single-necked, round-bottomed reaction flask equipped with a magnetic stirrer. The temperature of the contents of the flask was lowered to about 0° C., and 5.3 g of ethylene oxide and 0.5 ml of boron trifluoride diethyl etherate were then added to initiate polymerization. The flask was kept in an ice bath until the temperature returned to 0°–2° C. (about 45 minutes). The mixture was stirred at room temperature overnight. About 2 ml of 1 molar NaOH solution was added to the mixture and the volatiles were removed under vacuum. Then, 12 ml of 2.5 molar NaOH solution was added. The mixture was stirred at about 0° C. for about 5 hours and then heated to about 40° C. for about 24 hours. The methanol and residual solvents were removed by rotary evaporation. The solution was concentrated to about 15%, precipitated in about 100 ml of methanol, and stirred for 30 minutes. The precipitate was recovered by filtration and dried. The precipitate was then redissolved in distilled water, precipitated into methanol, stirred, and recovered by filtration. The yield was about 74.8%. Analysis of the product, including the chain length, by Proton Magnetic Resonance (PMR) Spectra Analysis, showed that the product was a copolymer (hereinafter referred to as comparative polymer A1) having the following empirical formula:

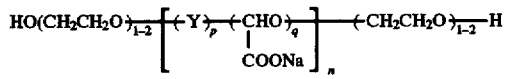

where n averages about 20, Y is —CH$_2$CH$_2$O— randomly distributed in the copolymer, and the ratio of p to q is about 1:3.

TABLE 1

| Name | | Molecular weight of PEG moiety | Number-average molecular weight of block copolymer |
|---|---|---|---|
| Example A1 | Block copolymer 1 | 4,400 (x = 100) | 9,000 (y = 48) |
| Example A2 | Block copolymer 2 | 4,400 (x = 100) | 5,600 (y = 12) |
| Example A3 | Block copolymer 3 | 3,000 (x = 68) | 8,200 (y = 54) |
| Example A4 | Block copolymer 4 | 924 (x = 21) | 5,000 (y = 42) |
| Example A5 | Block copolymer 5 | 308 (x = 7) | 4,500 (y = 44) |
| Example A6 | Block copolymer 6 | 264 (x = 6) | 11,800 (y = 120) |
| Comparative Example A1 | Comparative polymer A1 | Random copolymer (molecular weight 8,500) | |

Hereinafter illustrated are embodiments in which the above-obtained block copolymers are used as cement dispersants, pigment dispersants, water-treating agents, and detergent builders.

EXAMPLES B1 TO B2 AND COMPARATIVE EXAMPLES B1 TO B2

[Cement dispersant]

The cement dispersibility was confirmed from mortar tests using block copolymers 1 to 2, comparative polymer 1 (Na salt of naphthalenesulfonic acid-formalin condensed product), and comparative polymer A1 as cement dispersants as follows:

First, 400 g of normal portland cement and 800 g of standard sand from Toura, Japan were charged into a mortar mixer to knead them under dry conditions for 1 minute. Then, 240 g of an aqueous solution, in which a predetermined amount of cement dispersant was dissolved, was added into the mixer to knead the mixture for 3 minutes, thus obtaining mortar. This mortar was entirely filled into a hollow cylinder which was placed on a glass plate and of which the inner diameter and the height were both 50 mm. The filled cylinder was softly lifted to define an average value between the length and the breadth of spread mortar as a mortar flow value. The larger mortar flow value shows the better dispersibility. Results of the mortar tests are shown in Table 2.

As is seen in Table 2, it would be understood that block copolymers 1 and 2 give an equivalent mortar flow value in a smaller addition amount and are therefore more excellent in cement dispersibility, when compared 10 with comparative polymers 1 and A1.

TABLE 2

| | Dispersant | Addition amount[a] (wt %) | Mortar flow value (mm) |
|---|---|---|---|
| Example B1 | Block copolymer 1 | 0.25 | 109 |
| Example B2 | Block copolymer 2 | 0.25 | 86 |
| Comparative Example B1 | Comparative polymer 1[b] | 0.70 | 86 |
| | | 0.90 | 95 |
| Comparative Example B2 | Comparative polymer A1 | 1.5 | 98 |

[a] Weight % in terms of solid content of cement dispersant to cement.
[b] Na salt of naphthalenesulfonic acid-formalin condensed product.

EXAMPLE B3 AND COMPARATIVE EXAMPLES B3 TO B4

[Pigment dispersant]

The pigment dispersibility was confirmed by measuring slurry viscosity using block copolymer 1, comparative polymer 2 (sodium polyacrylate (molecular weight 5,000)), and comparative polymer A1 as pigment dispersants as follows:

A slurry was prepared which had a light calcium carbonate (Brilliant 1500, made by Shiraishi Kogyo Kabushiki Kaisha)/water ratio by weight of 60/40. Each polymer of 0.3% by weight relative to calcium carbonate was added to this slurry. The resultant mixture was stirred for 3 minutes and then allowed to stand stationary for 1 minute. Then, the viscosity of the mixture was measured with a B-type rotatory viscosimeter, model BM (made by Tokyo Keiki Co.). When any polymer was not added to the slurry, the viscosity was unmeasurable. Results are shown in Table 3.

TABLE 3

| | Dispersant | Slurry viscosity (cps) |
|---|---|---|
| Example B3 | Block copolymer 1 | 58 |
| Comparative Example B3 | Comparative polymer 2 | 2,900 |

TABLE 3-continued

| | Dispersant | Slurry viscosity (cps) |
|---|---|---|
| Comparative Example B4 | Comparative polymer A1 | 2,700 |

When no dispersant was added, the viscosity was unmeasurable.

EXAMPLES B4 TO B6 AND COMPARATIVE EXAMPLES B5 TO B6

[Water-treating agent]

The performance of block copolymers 1, 4, and 5 and comparative polymers 2 and A1 as water-treating agents was evaluated by carrying out a gelation resistance test and by measuring a scale inhibition ratio as follows:

1) Gelation resistance test

Solution A was prepared by mixing 100 g of a 100 mg/l aqueous calcium chloride (dihydrate) solution and 1 ml of an aqueous solution of each polymer (concentration: 1%) in a glass bottle of 225 ml in capacity and then adjusting the pH of the resultant test solution to 8.5 with NaOH.

Solution B was prepared by mixing 1 ml of the 1% aqueous polymer solution and 100 g of pure water as a blank instead of the 100 mg/l aqueous calcium chloride (dihydrate) solution in the same glass bottle as above-mentioned and then adjusting the pH of the resultant mixture to 8.5 with NaOH.

The above-mentioned glass bottles were closed up tight and allowed to stand stationary at 90° C. for 2 hours. Then, the absorbance of the respective solutions in the bottles to UV 380 nm was measured to calculate the gelation degree from the below-mentioned formula. The smaller numerical value of the gelation degree shows the higher gelation resistance, so the chemical acts more effectively. Results thereof are shown in Table 4.

Gelation degree=(absorbance of solution A)−(absorbance of solution B)

2) Scale inhibition ratio

First, 170 g of water was placed into a glass bottle of 225 ml in capacity. Next, 10 g of a 1.56% aqueous calcium chloride (dihydrate) solution and 3 g of a 0.02% aqueous polymer solution were added into the bottle, and furthermore, 10 g of a 3% aqueous sodium hydrogen carbonate solution and 7 g of water were added to the bottle, whereby the amount of the entire contents of the bottle resulted in 200 g. The bottle was closed up tight and then heated at 70° C. for 3 hours. Then, after cooling, the resultant precipitate was filtered off with a membrane filter of 0.45 μm, and the calcium concentration of the filtrate was measured by an ICP analysis method to calculate a calcium carbonate scale inhibition ratio on the basis of the following formula. Results thereof are shown in Table 4.

Scale inhibition ratio (%)=[(Z-Y)/(X-Y)]×100 where:

X is a concentration (%) of calcium which was dissolved in the solution before the test;

Y is a concentration (%) of calcium in a filtrate to which no scale inhibitor is added; and is a concentration (%) of calcium in a filtrate after the test.

TABLE 4

| | Water-treating agent | Gelation degree | Scale inhibition ratio |
|---|---|---|---|
| Example B4 | Block copolymer 1 | 0.01 | 75.3 |
| Example B5 | Block copolymer 4 | 0.01 | 85.3 |
| Example B6 | Block copolymer 5 | 0.02 | 90.5 |
| Comparative Example B5 | Comparative polymer 2 | 0.53 | 68.4 |
| Comparative Example B6 | Comparative polymer A1 | 0.8 | 48 |

EXAMPLES B7 TO B12 AND COMPARATIVE EXAMPLES B7 TO B9

[Detergent builder and detergent composition]

The performance of block copolymers 1 to 6, comparative polymer 3 (diglycolic acid), and comparative polymer A1 as detergent builders and the performance of detergent compositions containing these polymers were evaluated by carrying out washability and biodegradability tests as follows:

1) Washability test

Detergent compositions were prepared by mixing each detergent builder (in terms of solid content), sodium salt of linear chain alkylbenzenesulfonic acid, #2 sodium silicate, anhydrous sodium carbonate, and anhydrous sodium sulfate in a ratio by weight of 3/25/12.5/12.5/47.

In addition, dirty cloth was prepared as follows:

First, 6.64 g of myristylic acid, 6.64 g of oleic add, 6.64 g of tristearin, 6.64 g of triolein, 0.88 g of cholesterol stearate, 4.40 g of paraffin wax (m.p. 48°–50° C.), 4.40 g of squalene, and 3.52 g of cholesterol were dissolved into carbon tetrachloride, to which 39.76 g of clay (Kanto loam) (11 types of test dust, made by Japan Powder Industrial Technical Society) and 0.48 g of carbon black (for washability test designated by Japan Oil Chemist's Society) were then added, wherein the components other than clay and carbon black were commercially available first or special class reagents. The mixture was stirred at about 7,000 rpm for 30 minutes with a homomixer, thus preparing two sets of artificial grime. Next, test cloth (#3 white cotton cloth according to JIS) was twice contaminated with the two sets of artificial grime using a continuous autocontaminator and then allowed to stand stationary at 25° C. for 3 weeks and then cut to make 10 cm×10 cm artificial dirty cloth.

Next, 8 sheets of the above-prepared 10 cm×10 cm artificial dirty cotton cloth were placed into 1 liter of an aqueous solution of the above-prepared detergent composition and washed at 100 rpm with Terg-O-Tometer (made by Ueshima Seisakusho Co., Ltd.) under the following conditions:

(Washing conditions)

Washing time: 10 minutes

Concentration of detergent composition: 200 ppm (calculated as sodium salt of linear chain alkylbenzenesulfonic acid)

Sample: 200 ppm

Hardness of water: 3° DH

Water temperature: 25° C.

Rinsing: 5 minutes with tap water

The washability was evaluated by measuring the respective reflectivity of the uncontaminated original white cloth and the dirty cloth of before and after washing with a color difference meter, and then calculating the washing ratio on the basis of the following formula:

Washing ratio (%) = {(reflectivity of dirty cloth after washing) - (reflectivity of dirty cloth before washing)}/ {(reflectivity of white cloth) - (reflectivity of dirty cloth before washing)} × 100.

2) Biodegradability test

The biodegradability was evaluated by measuring the biodegradation ratio in accordance with a revised MITI test (I) method as disclosed in an OECD guide line.

Results are shown in Table 5.

TABLE 5

| | Detergent builder | Washing ratio (%) | Biodegradation ratio (%) |
|---|---|---|---|
| Example B7 | Block copolymer 1 | — | 75 |
| Example B8 | Block copolymer 2 | 66 | 73 |
| Example B9 | Block copolymer 3 | — | 78 |
| Example B10 | Block copolymer 4 | — | 85 |
| Example B11 | Block copolymer 5 | 70 | 87 |
| Example B12 | Block copolymer 6 | 73 | 87 |
| Comparative Example B7 | Comparative polymer 3 | 63 | — |
| Comparative Example B8 | Comparative polymer A1 | 63 | 35 |
| Comparative Example B9 | None | 56 | — |

The washing ratios in Table 5 were average values of the 8 sheets of dirty cloth.

What is claimed is:

1. A block copolymer which comprises:

a polyalkylene glycol structural unit of the following general formula (1):

$$\text{\textlparenthesis} C_nH_{2n}O \text{\textrparenthesis}_x \tag{1}$$

wherein n is an integer of 2 to 4; and x is a number of 6 or more on average; and a polyglyoxylate structural unit of the following general formula (2):

$$\text{\textlparenthesis}\underset{\underset{\text{COOM}}{|}}{CHO}\text{\textrparenthesis}_y \tag{2}$$

wherein: M is selected from the group consisting of a hydrogen atom, alkyls with 1 to 4 carbon atoms, metal atoms of 1 to 3 in valency, ammonium groups, and organic amine groups; and y is a number of about 10 or more on average.

2. A block copolymer according to claim 1, wherein at least one terminal moeity is selected from the group consisting of structures of the following general formulae (3) and (4):

$$-OC_nH_{2n}OR^1 \tag{3}$$

wherein: n is an integer of 2 to 4; and $R^1$ is selected from the group consisting of a hydrogen atom, alkyls, alkenyls, alkylphenyls, phenyl, and benzyl; and $$\underset{\underset{\text{COOM}}{|}}{-CHOX} \tag{4}$$

wherein: M is one type selected from the group consisting of a hydrogen atom, alkyls with 1 to 4 carbon atoms, metal atoms of 1 to 3 in valency, ammonium groups, and organic amine groups; and X is a group which is chemically stable to depolymerization of the block copolymer.

3. A block copolymer according to claim 2, wherein X is selected from the group consisting of alkyls, oxygen-containing alkyls, and oxygen-containing cycloalkyls.

4. A block copolymer according to claim 1, wherein x is in a range of about 20 to about 500 on average.

5. A block copolymer according to claim 1, wherein the ratio by weight of the polyalkylene glycol structural unit to the polyglyoxylate structural unit is in the range of about 2/8 to about 8/2.

6. A block copolymer according to claim 1, wherein the number-average molecular weight of the block copolymer is in the range of about 2,000 to about 50,000.

7. A block copolymer according to claim 1, wherein one of the structural units is designated A and wherein the other structural unit is designated B and wherein the block copolymer is an ABA block copolymer.

8. A block copolymer according to claim 1, wherein y falls in a range of about 20 to about 500 on average.

9. A block copolymer according to claim 1 prepared by a process comprising the step of carrying out a polymerization reaction between:

a polyalkylene glycol of the following general formula (5):

  (5)

wherein: $R^1$ is selected from the group consisting of a hydrogen atom, alkyls, alkenyls, alkylphenyls, phenyl, and benzyl; n is an integer of 2 to 4; and x is a number of 6 or more on average; and a glyoxylic acid-based monomer of the following general formula (6):

  (6)

wherein $R^2$ is an alkyl with 1 to 4 carbon atoms;
in the presence of a catalyst in a polymerization reaction system which has a water content of about 30 mol % or less relative to the polyalkylene glycol.

10. A detergent builder which comprises a block copolymer as recited in claim 1.

11. A detergent composition which comprises a surfactant and a detergent builder as recited in claim 10, wherein:

the surfactant is selected from the group consisting of anionic surfactants, nonionic surfactants, cationic surfactants, and amphoteric surfactants;

the surfactant comprises a concentration of about 10 to about 60% by weight of the detergent composition; and the detergent builder comprises a concentration of about 0.1 to about 60% by weight of the detergent composition.

12. A liquid detergent which comprises a block copolymer as recited in claim 1.

13. A water-treating agent which comprises a block copolymer as recited in claim 1.

14. A water-treating agent according to claim 13, wherein n is 2.

15. A cement dispersant which comprises a block copolymer as recited in claim 1.

16. A pigment dispersant which comprises a block copolymer as recited in claim 1.

17. A process for producing a block copolymer, which comprises the step of carrying out a polymerization reaction between:

a polyalkylene glycol of the following general formula (5):

  (5)

wherein: $R^1$ is selected from the group consisting of a hydrogen atom, alkyls, alkenyls, alkylphenyls, phenyl, and benzyl; n is an integer of 2 to 4; and x is a number of about 5 or more on average; and a glyoxylic acid-based monomer of the following general formula (6):

  (6)

wherein $R^2$ is an alkyl with 1 to 4 carbon atoms;
in the presence of a catalyst in a polymerization reaction system which has a water content of about 30 mol % or less relative to the polyalkylene glycol.

18. A process according to claim 17, wherein x is a number of 6 or more on the average.

19. A process according to claim 17, which further comprises the step of carrying out a saponification reaction of the resultant block copolymer using an alkaline substance.

20. A block copolymer which comprises:

a polyalkylene glycol structural unit of the following general formula (1):

  (1)

wherein: n is an integer of 2 to 4; and x is a number of about 5 or more on average; and a polyglyoxylate structural unit of the following general formula (2):

  (2)

wherein: M is selected from the group consisting of a hydrogen atom, alkyls with 1 to 4 carbon atoms, metal atoms of 1 to 3 in valency, ammonium groups, and organic amine groups; and y is a number of about 10 or more on average; and wherein one of the structural units is designated A and wherein the other structural unit is designated B and wherein the block copolymer is an AB block copolymer.

21. A block copolymer which comprises:

a polyalkylene glycol structural unit of the following general formula (1):

  (1)

wherein: n is an integer of 2 to 4; and x is a number of about 5 or more on average; and a polyglyoxylate structural unit of the following general formula (2):

  (2)

wherein: M is selected from the group consisting of a hydrogen atom, alkyls with 1 to 4 carbon atoms, metal atoms of 1 to 3 in valency, ammonium groups, and organic amine groups; and y is a number of about 10 or more on average; and wherein one of the structural units is designated A and wherein the other structural unit is designated B and wherein the block copolymer is a copolymer having at least one AB block, at least one ABA block, and at least one BAB block.

* * * * *